United States Patent [19]

Arendt

[11] 4,293,534
[45] * Oct. 6, 1981

[54] MOLTEN SALT SYNTHESIS OF ALKALINE EARTH TITANATES, ZIRCONATES AND THEIR SOLID SOLUTIONS

[75] Inventor: Ronald H. Arendt, Schenectady, N.Y.

[73] Assignee: General Electric Company, Schenectady, N.Y.

[*] Notice: The portion of the term of this patent subsequent to Nov. 11, 1997, has been disclaimed.

[21] Appl. No.: 180,294

[22] Filed: Aug. 22, 1980

[51] Int. Cl.$^3$ .................... C01G 23/00; C01G 25/00
[52] U.S. Cl. .................... 423/593; 106/73.3; 106/73.31; 501/136; 501/137; 423/598; 423/DIG. 12
[58] Field of Search ............... 423/593, 598, DIG. 12; 252/62.9; 106/73.3, 73.31

[56] References Cited

U.S. PATENT DOCUMENTS

| | | | |
|---|---|---|---|
| 3,509,057 | 4/1970 | Greger | 423/594 |
| 3,793,443 | 2/1974 | Arendt | 423/594 |
| 4,152,280 | 5/1979 | Arendt et al. | 423/DIG. 12 |
| 4,152,281 | 5/1979 | Arendt et al. | 423/DIG. 12 |
| 4,201,760 | 5/1980 | Arendt et al. | 423/DIG. 12 |

OTHER PUBLICATIONS

Bailey et al., "The Chemistry of Non-Aqueous Solvents", Academic Press, N.Y., 1966, pp. 291–297, vol. 1.
Beck et al., "APC Published Application, S.N. 393258", Jul. 13, 1943.
Beck et al., "APC Published Application, S.N. 292742", Jul. 13, 1943.

*Primary Examiner*—Herbert T. Carter
*Attorney, Agent, or Firm*—Jane M. Binkowski; James C. Davis, Jr.; Leo I. MaLossi

[57] ABSTRACT

A particulate mixture of an alkali metal hydroxide solvent, a reactant selected from the group consisting of titanium oxide, zirconium oxide and mixtures thereof, and an alkaline earth reactant selected from the group consisting of barium oxide, strontium oxide, and mixtures thereof, is heated to melt the alkali metal hydroxide solvent in which the reactants dissolve and react precipitating a titanate, zirconate or solid solutions thereof.

10 Claims, No Drawings

MOLTEN SALT SYNTHESIS OF ALKALINE EARTH TITANATES, ZIRCONATES AND THEIR SOLID SOLUTIONS

The present invention relates to the preparation of small crystallite size powder of alkaline earth titanate, zirconate and their solid solutions wherein the alkaline earth is selected from the group consisting of barium, strontium and mixtures, i.e. solutions, thereof.

Conventionally, barium or strontium titanate or zirconate powder is prepared by the high temperature solid state reaction of appropriate precursor compounds. The reaction product is in the form of relatively large, strong self-bonded particle aggregates which must be comminuted to the desired approximately 1.0 miron particle size before fabrication into ceramic articles.

One of the inadequacies of this conventional procedure is that the product, in commercial practice, is not fully reacted to yield uniform stoichiometry on a microscopic level. In cases where the physicochemical properties depend on the composition and its uniformity, the nonuniform composition of the conventional product can lead to less than optimum properties. Although procedures can be adopted in the conventional process to minimize these variations, the penalty in additional effort can be considerable.

The comminution portion of the conventional process is also potentially detrimental in that significant, uncontrollable quantities of undesirable impurities can be introduced from the grinding media. Again, extraordinary precautions can be taken to minimize the comminution effects, but with attendant penalties.

The present invention circumvents the inadequacies of the conventional process by substituting for the solid state reaction, a liquid phase reaction scheme utilizing a molten hydroxide solvent with subsequent precipitation of the product which does not require comminution. In the present process, the reactants are slightly soluble in the molten hydroxide solvent, therefore allowing literally atomic mixing in the liquid phase of the reactants. The solubilities of the reactants are such that they exceed the corresponding solubilities determined by the solubility product of the product in the molten hydroxide solvent. Hence, the reaction product precipitates spontaneously from the molten hydroxide solution. The reactants will continually dissolve to maintain a reactant-saturated solution until they are totally consumed by product formation.

Preferably, the reaction temperature in the present process is that required to attain reasonable reaction rates in the molten hydroxide solvent, but it can be significantly lower than in the corresponding conventional solid state synthesis. Similarly, the reaction time can be as short as about 30 minutes or shorter compared with several hours for solid state reaction.

The following copending U.S. patents and applications which disclose the utilization of a molten solvent of NaCl and/or KCl, are assigned to the assignee hereof and are incorporated herein by reference:

U.S. Pat. No. 4,152,281 entitled MOLTEN SALT SYNTHESIS OF LEAD ZIRCONATE TITANATE SOLID SOLUTION POWDER to Arendt et al. discloses that sodium chloride and/or potassium chloride is added to an aqueous suspension of the oxides of lead, titanium and zirconium and stirred until the suspension converts to a gel which is then heated evaporating the water and melting said chloride in which the oxides dissolve and react precipitating lead zirconate titanate.

U.S. Pat. No. 4,152,280 to Arendt et al. entitled MOLTEN SALT SYNTHESIS OF MODIFIED LEAD ZIRCONATE TITANATE SOLID SOLUTION POWDER discloses that sodium chloride and/or potassium chloride is added to an aqueous suspension of the oxides of lead, titanium zirconium and cationic modifier and stirred until the suspension converts to a gel which is then heated, evaporating the water and melting said chloride in which the oxides dissolve and react precipitating modified lead zirconium titanate.

Ser. No. 085,924 filed Oct. 18, 1979 for R. H. Arendt entitled MOLTEN SALT SYNTHESIS FOR BARIUM AND/OR STRONTIUM TITANATE POWDER discloses a process consisting essentially of forming a mixture of an alkali metal chloride solvent salt, titanium oxide and an alkaline earth reactant selected from the group consisting of barium oxide, strontium oxide, and mixtures thereof, and heating said mixture to melt the chloride salt solvent in which the titanium oxide and alkaline earth reactant dissolve and react precipitating a titanate selected from the group consisting of barium titanate, strontium titanate and mixtures thereof.

Ser. No. 180,343 filed August, 1980 for R. H. Arendt entitled MOLTEN SALT SYNTHESIS OF ALKALINE EARTH ZIRCONATE POWDER discloses a process consisting essentially of forming a mixture of an alkali metal chloride solvent salt, zirconium oxide and an alkaline earth reactant selected from the group consisting of barium oxide, strontium oxide, and mixtures thereof, and heating the resulting mixture to melt the chloride salt solvent in which the zirconium oxide and alkaline earth reactant dissolve and react precipitating a zirconate selected from the group consisting of barium zirconate, strontium zirconate and mixtures thereof.

However, attempts to prepare homogeneous solid solutions of the mixed titanate-zirconate compositions using an NaCl 50 mole % KCl solvent were unsuccessful. This result stems from the fact that the mixed alkaline earth titanates are significantly more readily formed than are the zirconates. It was determined that the problem was the difference in solvent aggressiveness, basicity in molten salt chemistry, toward $TiO_2$ and $ZrO_2$, and that what was required was a more highly basic solvent system than provided by the alkali metal chlorides.

The present invention provides such a solvent system with NaOH-KOH, 0-100 mole % KOH. In the present process the solvent does not enter into any undesirable reactions with either the reactants or product. Because of the more uniform aggressiveness of this solvent system, the solid solution product precipitates from the ionic melt as submicron, chemically homogeneous, relatively monodispersed crystallites.

Also, the present hydroxide solvent allows the production of $SrTiO_3$ and $BaTiO_3$ at a temperature about 150 K. lower than with the alkali chloride salt solvent and the production of $SrZrO_3$ and $BaZrO_3$ at a temperature about 170 K. lower than with the alkali metal chloride solvent.

Briefly stated, the present process for producing a powder of an alkaline earth titanate, zirconate, or solid titanate zirconate solution wherein the alkaline earth component is selected from the group consisting of barium, strontium and mixtures thereof, consists essentially of providing a particulate first reactant selected from the group consisting of $TiO_2$, $ZrO_2$ and mixtures thereof in at least stoichiometric amount or particulate precursor therefor, providing a particulate second reactant which is an alkaline earth oxide selected from the group consisting of BaO, SrO, and mixtures thereof in at least stoichiometric amount of particulate precursor therefor, providing an alkali metal hydroxide selected from the group consisting of sodium hydroxide, potassium hydroxide and mixtures thereof, forming a mixture of said reactants or precursors therefor and said hydroxide solvent, said hydroxide solvent being used in an amount of at least about 20% by weight of the total amount of said reactants and said hydroxide solvent, heating said mixture to a reaction temperature at least sufficient to melt said hydroxide solvent, each said precursor decomposing completely at or below said reaction temperature to form said oxide and by-product gas, said hydroxide solvent in molten form being a solvent for said reactants, maintaining said reaction temperature dissolving and reacting said reactants in said molten solvent and precipitating said alkaline earth titanate, zirconate or solid titanate zirconate solution, recovering said precipitated product by dissolving said hydroxide solvent and separating said precipitated product from the resulting solution.

Some of the reactions for producing the present alkaline earth products are as follows:

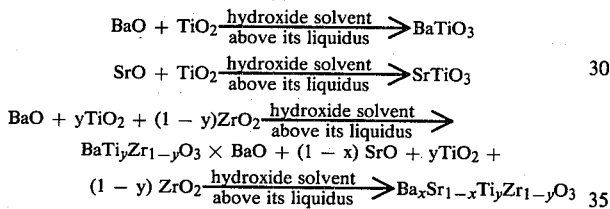

where x and y are <1.

All of the reactants are used in at least stoichiometric amounts to achieve complete reaction. Amounts of BaO and/or SrO in excess of stoichiometric results in the introduction of a secondary phase in the product, i.e. $Ba_3Ti_2O_7$ and $Sr_3Ti_2O_7$, or $Ba_3Zr_2O_7$ and $Sr_3Zr_2O_7$. Generally, the amount of this secondary phase increases with increasing excess amounts of the oxides of barium and strontium.

The present process produces alkaline earth titanate, zirconate or a solid titanate zirconate solution. Specifically, the present process produces a product selected from the group consisting of barium titanate, barium zirconate, strontium titanate, strontium zirconate, barium titanate zirconate, strontium titanate zirconate and barium strontium titanate zirconate. Since the crystals of the present alkaline earth product are produced by precipitation from a saturated solution, they are chemically homogeneous, i.e. they are of uniform composition on a microscopic level. Also, since the individual crystals range up to about 1 micron in size and are generally submicron, they do not require any crushing or grinding operations with their attendant contamination with impurities from the equipment employed before they can be fabricated into useful ceramic articles. Also, the crystals are roughly spherical, i.e. they lack sharp edges and corners, appearing as truncated cubes.

In carrying out the present process, the reactants or precursors therefor can be of commercial or technical grade, and their particular purity depends largely on the particular application of the resulting alkaline earth product. Specifically, the reactant oxides should not contain any impurities which would have a significantly deleterious effect on the resulting alkaline earth product powder or on its particular application.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders should also be free of large, hard aggregates, i.e. significantly above 100 microns in size, which might survive the mixing process and prevent sufficient reactant contact for satisfactory reaction rates.

In the present processs the hydroxide solvent is selected from the group consisting of sodium hydroxide, potassium hydroxide and mixtures thereof. The hydroxide solvent is used in a minimum amount of at least about 20% by weight of the total amount of reactant oxides and hydroxide solvent, and typically about 50% by weight. Amounts of hydroxide lower than about 20% by weight are not practical since the desired reaction will not proceed. There is no upper critical maximum amount of hydroxide, but amounts of hydroxide higher than about 80% by weight of the total amount of reactant oxides and hydroxide solvent provide no significant advantage. As the amount of hydroxide is increased from 20% by weight to about 50% by weight, the amount of individual grains or crystals present in the resulting alkaline earth product powder increases correspondingly, and with an amount of hydroxide above about 50% by weight, substantially all or all of the product powder recovered consists essentially of individual grains or crystallites.

The reactants or precursors therefor and the alkali hydroxide solvent are admixed to produce a substantially thorough mixture to insure good contact and complete reaction. The actual mixing operation can be carried out in several ways which do not introduce undesirable impurities into the resulting product. Preferably, water at room or ambient temperature is admixed with the reactant oxides or precursors therefor and the hydroxide solvent in an amount which, with stirring, is at least sufficient to form a slurry. The wet mixing can be carried out, for example, using a plastic milling medium or by wet mixing in a high speed blender with preferably distilled or deionized water, depending on the application of the resulting product and preferably, with stainless steel or plastic stirrers, for example, a propeller, in a stainless steel or plastic, preferably Teflon, lined vessel.

The reaction temperature varies with the compound being formed. For the present alkaline earth titanate the reaction temperature is $\geq 880$ K., for the alkaline earth zirconate it is $\geq 980$ K., and for the solid titanate zirconate solution it is $\geq 1150$ K. Reaction time is a strong function of the reaction temperature used, varying in an inverse fashion. For the given minimum reaction temperatures of 880 K., 980 K. and 1150 K., the minimum reaction times were 1, 1 and 5 hours respectively, for complete reaction.

The particular reaction temperature used also depends to some extent on the hydroxide solvent used. In molten form, the present hydroxide is a solvent for the reactant oxides, and the minimum reaction temperature is the temperature at which the hydroxide melts and for sodium hydroxide alone the melting point or liquidus temperature is about 591 K. whereas for potassium hydroxide alone it is about 633 K. All mixtures of sodium hydroxide and potassium hydroxide form a mixture which melts at a temperature below the melting point of sodium hydroxide alone and thus, for the eutectic mixture of 50 mole % potassium hydroxide —50 mole % sodium hydroxide the minimum reaction temperature is 460 K. Preferably, in the present invention, the minimum reaction temperature is at least about 10 K. above the melting point, i.e. liquidus temperature of the hydroxide solvent since such a temperature insures complete melting of hydroxide solvent and also increases the fluidity of the molten hydroxide producing increased wetting of the reaction mixture. However, the maximum reaction temperature is always below the melting point of the alkaline earth product being precipitated, which for $SrTiO_3$ is about 2311 K. and for $BaTiO_3$ is about 1889 K. and should be kept below the temperature at which the hydroxide vaporizes significantly, or crucible interaction becomes intolerable, even with compensation for loss during reaction mixture compounding. As a practical limit, ~1273 K. was found to be the upper bound in terms of maintaining an effective reaction medium. Particularly preferred is a reaction temperature ranging from about 880 K. to about 1250 K. since it is not difficult to maintain and provides high reaction rates without significant vapor loss of the molten salt solvent.

At reaction temperature the hydroxide melts and the reactant oxides dissolve and react in the molten hydroxide precipitating the alkaline earth product. The reaction temperature is maintained until the reaction is completed. The particular period of reaction time depends largely on reaction temperature as well as the amount of hydroxide solvent used and is determinable empirically. When the reaction is completed, the reacted mass is cooled at any convenient rate, preferably in air and preferably to about room temperature.

The cooled alkaline earth product-containing reacted mass is a solid, fired cake comprised of alkaline earth product particles distributed throughout a matrix of solidified hydroxide. Specifically, the alkaline earth product, which is maintained at distinct second phase crystallites, is present as fine crystallites embedded in the hydroxide matrix. After reaction at elevated temperature, the cooled, solidified cake is disintegrated with water to yield the alkaline earth product crystallites and an aqueous solutin of the hydroxide solvent. More specifically, water, preferably distilled or deionized to prevent introduction of impurities and preferably at room temperature, is added to the solid reacted mass in an amount at least sufficient to dissolve away the hydroxide content therefrom. The solubility of the present hydroxide solvent is $\geq 0.3$ kilogram per liter of water at room temperature. This dissolution preferably is carried out in a plastic vessel, and as a practical matter with mixing to substantially shorten dissolution time, using, for example, a motor driven plastic or stainless steel stirrer. As the hydroxide dissolves, the solid mass disintegrates leaving the present fine alkaline earth product powder that contains no perceptibly agglomerated material, i.e. perceptible to the eye. The alkaline earth product powder is then collected, washed and dried.

The present alkaline earth product powder can be recovered from the aqueous supernatant hydroxide solution by a number of techniques. For example, the alkaline earth product powder can be recovered by decanting the supernatant solution and drying the alkaline earth product in air. The particular recovery technique depends on the impurities which may be present and on the purity required in the ceramic or other product fabricated from the powder. Preferably, the resulting slurry is mixed at room temperature in air for about 20 minutes. Mixing is then discontinued and a flocculating agent which is organic and soluble in water, preferably an anionic flocculant, is added in an amount which is sufficient to flocculate and settle the alkaline earth product powder. After several washings and settlings, the wet powder is dried. Preferably, the flocculating agent is added in aqueous solution, about 0.1 gram of flocculant per 100 grams of water usually being satisfactory, and preferably the flocculating agent is used only in an amount necessary to settle the powder. For production of an alkali earth product powder of high purity, the flocculating agent should be completely removable by heating the powder in air at temperatures below the melting point of the powder and preferably not higher than about 1073 K. Preferably, to remove any remaining water and flocculant, it is heated at about 773 K. for about 20 minutes.

Alternatively, in the present process, if desired, a particulate inorganic precursor of the reactant oxides can be used. The precursor should decompose completely to form the oxide and by-product gas or gases leaving no contaminants in the reacted mass. Representative of the precursors of the reactant oxides useful in the present process are the carbonates, hydroxides and nitrates. The precursor should be used in an amount sufficient to produce the respective oxide in at least stoichiometric amount.

The present alkaline earth product powders range in color from an off-white for the titanates to a yellow for the zirconates. The alkaline earth product powders are free-flowing and can be in the form of aggregates or in the form of individual powder crystals, but usually it is a mixture of both. The aggregates which range in size from about 1 micron to about 20 microns, are particles consisting essentially of a cluster of smaller sized crystals weakly bonded together autogeneously, i.e. such bonding is believed to be caused by Van der Waal's forces or by self-bonding, i.e. neck growth between grains. The individual grains range up to about 1 micron in size and usually are submicron. The aggregates are friable and are readily broken down with very gentle comminution during subsequent pressing into a green body.

The present alkaline earth product powder can be prepared free of impurities or free of significant impurities. Therefore, when the same procedure is used, its properties are reproducible from batch to batch.

The present alkaline earth product powder can be pressed into green bodies of desired size and shape and fired at temperatures below its melting point in an oxygen-containing atmosphere such as air to produce fired polycrystalline bodies with densities of at least about 85% of theoretical density. Alternatively, the powder could be hot-pressed in an oxide die, preferably an alumina die press at temperatures of about 1573 K. to 1673 K. under a pressure of at least about 6000 psi to produce a hot pressed product having a density higher than 95% of theoretical density. These sintered or hot pressed products are useful, for example, as dielectric materials for capacitors and electrical circuits.

The invention is further illustrated by the following examples:

EXAMPLE 1

In this example, strontium titanate ($SrTiO_3$) was prepared.

354.64 grams of reagent grade $Sr(NO_3)_2$ (2% in excess of stoichiometry for $SrTiO_3$) ranging in size up to about 100 microns, 130.61 grams of reagent grade $TiO_2$ ranging in size up to about 100 microns, 161 ml. of a 50 wt. % aqueous NaOH solution and 197.90 grams of KOH (88.5 wt. % pure) were used.

The $Sr(NO_3)_2$ was dissolved in 700 ml distilled water at room temperature. The $TiO_2$ was added to the resulting solution and dispersed therein with vigorous stirring. The KOH was dissolved in the NaOH solution with 100 ml distilled water added thereto. The resulting hydroxide solution was added to the vigorously stirred reactant mixture and stirring was continued for about 20 minutes at room temperature. The resulting mixture was reduced to dryness by heating to 453 K. with occasional stirring.

The dried material was heated at a rate of 100 K. per hour to 878 K. where it was held for 5 hours in an air atmosphere while contained in covered, dense $\alpha$-$Al_2O_3$ crucibles and then allowed to cool to room temperature.

To retrieve the product, the cooled mass was placed in 23 liters of distilled water at room temperature and disintegrated by dissolution of the hydroxides to yield a dispersion of the product powder in an alkaline solution. The product was collected by filtration, washed on the filter and dried.

The product was an off-white powder. X-ray diffraction analysis of the product indicated the product to be phase pure $SrTiO_3$. B.E.T. surface area measurements of the product gave a value of 8.04 meters$^2$ gram$^{-1}$ which indicates a spherical equivalent average crystal diameter of $\sim$0.146 microns.

EXAMPLE 2

In this example barium zirconate ($BaZrO_3$) was prepared.

292.09 grams of $Ba(NO_3)_2$ (2% in excess of stoichiometry for $BaZrO_3$), 133.66 grams of $ZrO_2$, both of reagent grade and ranging in size up to about 100 microns, 161 ml of 50 weight % aqueous NaOH solution and 197.90 grams of KOH (88.5 weight % pure) were used.

A solution of the hydroxides was prepared as set forth in Example 1.

The $Ba(NO_3)_2$ and $ZrO_2$ were added to about 600 ml distilled water in a stainless steel food processing blender jar and the slurry was intensively mixed/comminuted for 60 seconds. The slurry was then transferred to a Teflon vessel. The hydroxide solution was added to the slurry with vigorous stirring at room temperature and mixing was continued for 20 minutes. The resulting reaction mixture was reduced to dryness by heating to 453 K. with occasional stirring.

The dried material was heated at a rate of 100 K. per hour to 1200 K. where it was held for 20 hours in an air atmosphere while contained in covered, dense $\alpha$-$Al_2O_3$ crucibles and then left to cool to room temperature. The $BaZrO_3$ product was retrieved in the same manner as the retrieval disclosed in Example 1.

The product was a yellow powder. X-ray diffraction phase analysis of the product showed the material to be phase pure $BaZrO_3$. B.E.T. surface area measurement of the product gave a value of 2.78 meters$^2$ gram$^{-1}$, which corresponds to a spherical equivalent average crystal diameter of $\sim$0.346 microns.

EXAMPLE 3

This example was directed to the production of a solid solution of $SrTiO_3$-50 mole % $BaZrO_3$.

141.47 grams $Sr(NO_3)_2$ (2% in excess of stoichiometry), 175.58 grams $Ba(NO_3)_2$ (2% in excess of stoichiometry), 52.10 grams $TiO_2$, and 80.35 grams $ZrO_2$, all of reagent grade and ranging in size up to about 100 microns were used. 161 ml of a 50 weight % aqueous NaOH solution and 197.90 grams of KOH (88.5 weight % pure) were also used.

The mixture of reactants, the solution of hydroxides and the reaction mixture all were prepared as set forth in Example 2.

The dried mixture was heated at a rate of 100 K. per hour to 1200 K. where it was held for 20 hours in an air atmosphere using covered, dense $\alpha$-$Al_2O_3$ crucibles and then left to cool to room temperature. The cooled mass was treated as set forth in Example 2 to retrieve the product.

The retrieved product was a yellowish white powder. X-ray diffraction phase analysis of the product indicated the presence of a single compound with the same perovskite space group as $SrTiO_3$ and $BaZrO_3$, but with a lattice parameter of $a_o$ 4.167 Å (corresponding X-ray density 5280 Kg meter$^{-3}$). B.E.T. surface area measurement of the product gave a value of 19.9 meters$^2$ gram$^{-1}$, corresponding to a spherical equivalent average crystal diameter of $\sim$0.057 microns.

EXAMPLE 4

A powder produced in the same manner as set forth in Examples 1, 2 or 3 can be hot pressed in an alumina die under a pressure of at least about 6000 psi and a temperature of about 1573 K. to 1673 K. for about 10 minutes to produce a hot pressed body such as, for example, a disc, having a density higher than 95% of theoretical. Such hot pressed products would be useful as dielectric material for an electrical circuit.

What is claimed is:

1. A process for producing a product selected from the group consisting of an alkaline earth titanate, an alkaline earth zirconate, and an alkaline earth titanate zirconate wherein the alkaline earth component is selected from the group consisting of barium, strontium and mixtures thereof, which consists essentially of providing a particulate first reactant selected from the group consisting of $TiO_2$, $ZrO_2$ and mixtures thereof in at least stoichiometric amount or particulate precursor therefor, providing a particulate second reactant which is an alkaline earth oxide selected from the group consisting of BaO, SrO, and mixtures thereof in at least stoichiometric amount or particulate precursor therefor, providing an alkali metal hydroxide selected from the group consisting of sodium hydroxide, potassium hydroxide and mixtures thereof, forming a mixture of said reactants or precursors therefor and said hydroxide solvent, said hydroxide solvent being used in an amount of at least about 20% by weight of the total amount of said reactants and said hydroxide solvent, heating said mixture to a reaction temperature at least sufficient to melt said hydroxide solvent and form said product, each said precursor decomposing completely at or below said reaction temperature to form said oxide and byproduct gas, said hydroxide solvent in molten form being a solvent for said reactants, maintaining said reaction temperature dissolving and reacting said reactants in said molten solvent and precipitating said product, recovering said precipitated product by dissolving said hydroxide solvent and separating said precipitated product from the resulting solution.

2. The process according to claim 1 wherein said reactant is $TiO_2$ and said alkaline earth oxide is BaO.

3. The process according to claim 1 wherein said reactant is $TiO_2$ and said alkaline earth oxide is SrO.

4. The process according to claim 1 wherein said reactant is $TiO_2$ and said alkaline earth oxide is a mixture of BaO and SrO.

5. The process according to claim 1 wherein said reactant is $ZrO_2$ and said alkaline earth oxide is BaO.

6. The process according to claim 1 wherein said reactant is $ZrO_2$ and said alkaline earth oxide is SrO.

7. The process according to claim 1 wherein said reactant is a mixture of $TiO_2$ and $ZrO_2$ and said alkaline earth oxide is BaO.

8. The process according to claim 1 wherein said reactant is a mixture of $TiO_2$ and $ZrO_2$ and said alkaline earth oxide reactant is SrO.

9. The process according to claim 1 wherein said reactant is a mixture of $TiO_2$ and $ZrO_2$ and said alkaline earth oxide reactant is a mixture of BaO and SrO.

10. The process according to claim 1 wherein said hydroxide solvent is a mixture comprised of 50 mole % sodium hydroxide and 50 mole % potassium hydroxide.

* * * * *